(12) United States Patent
Dackefjord et al.

(10) Patent No.: US 10,444,324 B2
(45) Date of Patent: Oct. 15, 2019

(54) SINGLE NODE LOCATION SYSTEM AND METHOD

(71) Applicant: NiDa Tech Sweden AB, Malmö (SE)

(72) Inventors: Håkan Dackefjord, Älvsjö (SE); Warwick Taws, Bromma (SE)

(73) Assignee: NIDA TECH SWEDEN AB, Malmö (SE)

( * ) Notice: Subject to any disclaimer, the term of this patent is extended or adjusted under 35 U.S.C. 154(b) by 0 days.

(21) Appl. No.: 16/027,437

(22) Filed: Jul. 5, 2018

(65) Prior Publication Data

US 2018/0313931 A1 Nov. 1, 2018

Related U.S. Application Data

(63) Continuation of application No. PCT/SE2017/050167, filed on Feb. 22, 2017.

(30) Foreign Application Priority Data

Feb. 22, 2016 (SE) ........................................ 1650226

(51) Int. Cl.
*H04W 64/00* (2009.01)
*G01S 5/14* (2006.01)
*G01S 3/48* (2006.01)
*G01S 5/12* (2006.01)
*H04B 17/30* (2015.01)
*G01S 5/10* (2006.01)
*G01S 3/46* (2006.01)

(52) U.S. Cl.
CPC ............... *G01S 5/14* (2013.01); *G01S 3/46* (2013.01); *G01S 3/48* (2013.01); *G01S 5/10* (2013.01); *G01S 5/12* (2013.01); *H04B 17/30* (2015.01); *H04W 64/00* (2013.01)

(58) Field of Classification Search
CPC ....... G01S 5/14; G01S 3/46; G01S 5/10; G01S 3/48; G01S 5/12; H04B 17/30; H04W 64/00
See application file for complete search history.

(56) References Cited

U.S. PATENT DOCUMENTS

2014/0194142 A1* 7/2014 Hedley .................. G01S 5/14
455/456.1

FOREIGN PATENT DOCUMENTS

WO 2013/010204 A1 1/2013

* cited by examiner

*Primary Examiner* — Chuong A Ngo
(74) *Attorney, Agent, or Firm* — Gabriela B. Tomescu, Esq.; Bergenstråhle & Partners AB

(57) ABSTRACT

A node for determining the position of a device, wherein the node is configured to transmitting a Response Request Message, RRM, to the device, start at least one counter at the transmission of the RRM from a physical or data link layer of multiple abstraction layers being adapted to perform different tasks in the node, receive a Response Message, RM, from the device as a response to the RRM, stop the at least one counter at the reception of the RM, wherein the node further is adapted to record a counter result at the reception of RM in the physical or data link layer for each of at least three omni-directional antenna elements in the node using the at least one counter, determine the distance between the node and the device based on the recorded counter results, record an arrival angle, for the reception of the RM at each of the at least three omni-directional antenna elements, and determine the position of the device based on the determined distance and the recorded arrival angles.

11 Claims, 8 Drawing Sheets ively to implement in both mobile devices and other types of nodes, such as smartphones or access points.

SINGLE NODE LOCATION SYSTEM AND METHOD

This application is the continuation of International Application No. PCT/SE 2017/050167, filed 22 Feb. 2017, which claims the benefit of Swedish Patent Application No. SE 1650226-2, filed 22 Feb. 2016, the entire contents of which are hereby incorporated by reference.

TECHNICAL FIELD

The present invention relates generally to a system and method for locating a device using a single node.

BACKGROUND ART

Localization of nodes and device e.g. mobile devices in wireless communication networks, such as for instance Wi-Fi standards under 802.11x, Bluetooth, Zigbee standards under 802.15x, or any other suitable wireless communication network, has previously been based on so-called round trip time (RTT) measurements for receiving distance information between nodes. Different solutions have been utilized, such as time of flight, time of arrival, angle of arrival but all with limited success regarding both range and accuracy. The current systems for positioning in the wireless networks has relevant drawbacks. The precision is poor using RTT due to the involvement of an unknown processing time/time delay in a node after first receiving a message signal from a device before the signal is sent back to the node. The processing time is non-deterministic and varies between different devices in a wireless network. Furthermore, such processing times can vary within specific devices due to the work load of the processor.

One solution to the problem of determining an accurate distance between nodes in a wireless communication network would be to exclude the processing time by measuring only the Time of Flight between two nodes. However, this requires that the same time base is used at both nodes, which presents a similar problem as the one described for RTT. Achieving a mutual time base in different nodes requires synchronization between said nodes. Such synchronization is, in a similar way as when measuring RTT, affected by processing times in the nodes. Thereby, the original problem is recreated.

Furthermore, conventional systems such as Wi-Fi and Bluetooth have only a short distance of range which make the systems unpractical and difficult to extend into larger environments.

Yet another problem with prior art solutions is that RTT measurements only provides a distance as the result. The distance to an object can for many implementations be very useful but at the same time there are many application areas that would require a position instead of merely a distance. In order to solve this issue attempts to combine technologies has been presented in prior art, such as solutions wherein signal strength is used to determine a direction, so called angle of arrival. The accuracy of angle of arrival measurements is dependent of the frequency of the signal, echoes, and topography that all affects the performance. In prior art attempts to solve those issues are presented, for example a known solution in the art is to allow a user or device to rotate with a shield while measuring signal strength in order to together with a compass or gyro establish a direction. This works well but requires the user to perform an action or the device to have complex mechanics to perform the same operation automatically. Thereby are those solutions unprac- As known in the art there are other solution commonly used for positioning, such as global positioning systems, especially GPS and GLONASS systems. GPS systems have good accuracy and works well outdoors but have numerous of issues relating to energy consumption, indoor coverage, and coverage in crowded cities with tall buildings surrounding the open streets.

In order to address the problems with GPS there are solutions available on the market utilizing triangulation wherein multiple nodes sends signals to a device and triangulates the position of the device. Those solutions have shown to generally have bad coverage and requires fixed networks with multiple nodes.

With the above solutions in mind it would be advantageous to provide a wireless communication positioning system and method that would allow for more accurate position determinations without the drawbacks of the prior art.

SUMMARY OF INVENTION

An object of the present invention is to provide a single node location system for positioning of a device through eliminating the need for triangulation. A problem with the prior art is that wireless signals have oscillating physical characteristics making the angle of arrival deviate from the angle of the device's position. This will further be described in the detailed description.

Another object of the present invention is to provide a solution that resolves the previous issues for angle of arrival. Preferably with a single measurement that could provide an accurate reading of the direction of a device without the need for shields, rotation, or any other form of intervention of a user.

Yet another object of the present solution is to provide an accurate positioning system enabling low energy consumption in devices.

Thus the solution relates to a method performed by a node configured or adapted to determining the position of a device, the method comprising:
  transmitting a Response Request Message, RRM, to the device;
  starting at least one time counter at the transmission of the RRM from a physical or data link layer of multiple abstraction layers being adapted to perform different tasks in the node,
  receiving a Response Message, RM, from the device as a response to the RRM,
  stopping the at least one time counter at the reception of the RM, wherein the method further comprises:
  recording a time counter result at the reception of the RM in the physical or data link layer for each of at least three omni-directional antenna elements in the node using the at least one counter,
  determining the distance between the node and the device based on the recorded time counter results,
  recording a received phase at a reception point of each of the at least three omni-directional antenna elements for the reception of the RM,
  calculating an Angle of Arrival, AoA, based on the differences of the received phases and a transmission frequency for the RRM and/or the RM, and
  determining the position of the device based on the determined distance and the calculated AoA.

It is one advantage with the present solution that positioning can be conducted with a single node. Thereby the need for triangulation is removed. However, it should be noted that the solution can be utilized in combination with triangulation, for example to reach better accuracy determination.

According to an embodiment the RRM and the RM are signals at a frequency between 860 and 930 MHz, or between 430 and 480 MHz, or between 2.4 and 2.5 GHz, or between 5.0 and 6.0 GHz.

According to an embodiment the RRM and the RM are signals at a frequency between 860 and 930 MHz.

There are many advantage with using frequencies around 900 MHz, especially in relation to coverage in areas where walls or other structures blocks the clear line of sight.

According to an embodiment the node calculates the Time of Flight, ToF based on the counter results and an internal response time of the device as $$ToF=(T_{Xa}+T_{Xb}+\ldots+T_{Xn})-T_Y.$$

wherein $T_{Xn}$ describes the time of flight at each antenna and $T_Y$ is the processing time in the device.

According to an embodiment the AoA is calculated based on phase difference.

In one embodiment the key to calculate the AoA at each antenna is to determine the phase difference. The phase difference together with the knowledge of the frequency is used to determine the AoA for the node.

According to an embodiment the at least three omni-directional antenna elements are arranged at distances equally spaced from each other and the distance corresponds to less than half the wavelength of a transmission frequency for the RRM and/or the RM.

It is one advantage that the antennas in one embodiment are arranged with a distance between them corresponding to half the wavelength or less, this enables phase determination within the same period of RM.

According to an embodiment the distance is between 10.8 and 11.1 cm.

According to an embodiment the method further comprise:
determining an absolute position of the node by means of a second positioning means arranged in said node,
determining an absolute position of the device based on the determined absolute position of the node, the AoA, and the ToF.

The absolute position is a position defined in a space, i.e. the position is known in relation to the surroundings in contrast to just the position which is defined for example in relation to one or more nodes. For example, a position can be at a certain angle and distance from a node while the absolute position is a specific position on for example a map.

According to an embodiment the method is performed more than once and the method further comprise:
collecting multiple ToFs and calculated AoAs,
determining an average error based on the collected ToFs and calculated AoAs, and
using the average error when determining the position of the device.

It is one advantage that the accuracy can be improved through using average errors from multiple readings, as stated above.

According to an aspect a node for determining the position of a device is configured to transmit a Response Request Message, RRM, to the device, start at least one time counter at the transmission of the RRM from a physical or data link layer of multiple abstraction layers being adapted to perform different tasks in the node, receive a Response Message, RM, from the device as a response to the RRM, stop the at least one time counter at the reception of the RM, characterized in that the node further is configured to record a time counter result at the reception of the RM in the physical or data link layer for each of at least three omni-directional antenna elements in the node using the at least one time counter, determine the distance between the node and the device based on the recorded time counter results, record a received phase at a reception point of each of the at least three omni-directional antenna elements for the reception of the RM, calculate an Angle of Arrival, AoA, based on the differences of the received phases and a transmission frequency for the RRM and/or the RM, and determine the position of the device based on the determined distance and the calculated AoA.

According to an embodiment the node is configured to perform the method as described above.

According to an aspect a method is performed by a device for enabling determination of the position of the device by a node, the node being a node as described above. The device performs a method comprising:
receiving a response request message, RRM from the node,
transmitting a Response Message, RM, to the node as a response to said RRM, wherein said RM is transmitted by a physical or data link layer of multiple abstraction layers in the device.

According to an embodiment the device comprises multiple Omni-directional antenna elements and performs the method of a node as described above.

It is one advantage that in distributed networks it is possible for a device to act as a node.

One advantages with the method for positioning a device as disclosed herein is that the multiple Omni-directional antennas enable an accurate calculation of the AoA.

Another advantage with the method for positioning of a device as disclosed herein is that multiple technologies are combined in an inventive and novel way.

Yet another advantage is that the method for positioning performs operations in the lower levels of abstraction layers minimizing processing times.

According to one embodiment, a method is provided wherein, the node for example could be an access point, base station, main unit, cell phone, or any other form of suitable node. The node comprises communication unit, such as a network communication unit, which enables the device to perform wireless communication. Such network communication unit can in one embodiment be a network card, wireless LAN chip, Bluetooth chip, or any other unit that enables network communication.

BRIEF DESCRIPTION OF DRAWINGS

The invention is now described, by way of example, with reference to the accompanying drawings, in which.

DESCRIPTION OF EMBODIMENTS

Figure 1:
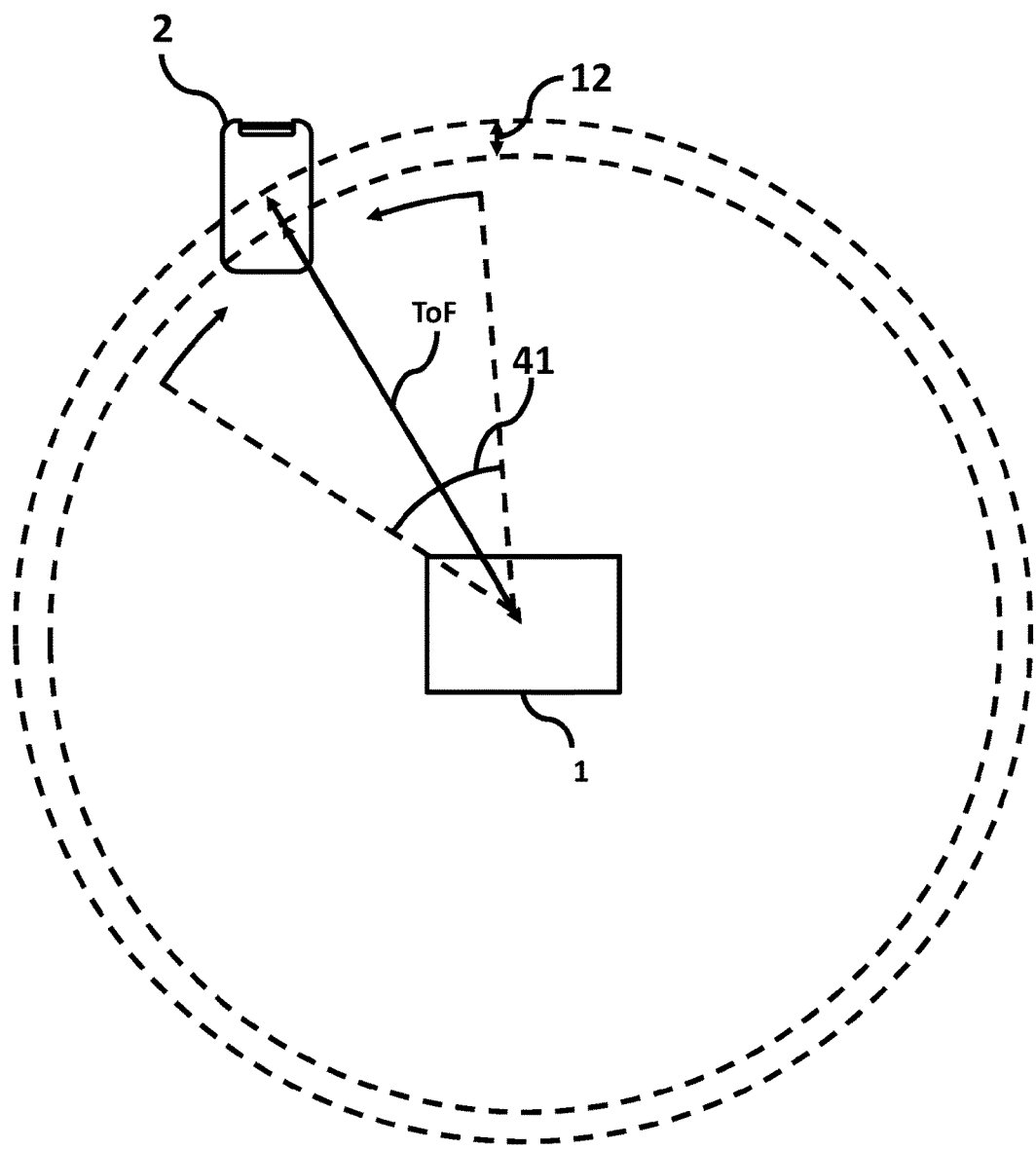
FIG. 1 illustrates a principle drawing of one embodiment of a method and positioning system comprising a node and a device wherein time of flight and angle of arrival is utilized.

In the following, a detailed description of the different embodiments of the solution is disclosed under reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function.

Briefly, the solution relates to a single node positioning system wherein the position of a device, or another node, can be determined based on readings from a single node. This is a distinct improvement over the prior art solutions wherein multiple nodes are utilized for triangulation and similar means of positioning. The enhanced system has multiple advantages such as less power consumption, possibility to keep the battery consumption in the device to a minimum through conducting most calculations in the node as well as eliminating the need for the device to transmit response to multiple nodes reducing the number of transmissions and thereby increasing battery life.

The node and device comprises multiple abstraction layers that performs different tasks of the communication unit. There are different models for describing functionality as well as dividing functionality between layers but the most common model is the OSI-model. The OSI-model (Open System Interconnection model) is a conceptual model for describing communication functions in a telecommunication or computing system. The model is completely separated from the physical factors of components in a node, or device, and instead describes where among the layers the functionality is performed. Thereby functionality can be performed in a single layer of a single or multiple components.

The solution as disclosed herein is not limited to the OSI model and different embodiments utilizes different form of communication and protocols. Thereby, the person skilled in the art understands that different models can be utilized to describe the functionality and therefor detailed information about different models are not disclosed herein.

To provide brief understanding of different layers the functionality of different levels will be described.

Low level layers, such as a physical or data link layer performs tasks that are close to the hardware of the node, or device.

The physical layer, also known as layer 1, defines electrical and physical specifications for the transmission and the medium used for the communication. For example, a radio frequency and the layout of the wireless device is part of the physical layer. It further defines modes for transmission, such as simplex or duplex transmission and handles raw data, encoding of bits, and defines network topology.

The data link layer, also known as layer 2, provides the functionality of data transfer and thereby the link between for example nodes and devices. Examples are media access control layers responsible for controlling networks, for example Ethernet and Wi-Fi operates at the data link layer.

In order to better understand the context of the present invention it should be understood that most applications run in or utilize higher level layers, such as the application layer, to perform calculations and actions providing functionality. There are many drawbacks with such solutions, for example increased and undefined processing times.

FIG. 1 illustrates one embodiment of a principle for how the single node positioning system works. The node 1 sends a response request message RRM to a device 2 that response with a response message RM. The time of flight ToF is determined in order to get a distance to the device 2. In most situations there is an error 12 that provides a round corridor around the node 1 where the device 2 can be located. The node 1 only knows that the device 2 is somewhere in this corridor and therefor need to utilize the angle of arrival 41 to determine the actual position of the device 2. The embodiment as described here is a general embodiment and does not cover all of the inventive features of the solution. This embodiment describes the broadest form and aims to describe how the solution works. Further details will be set out below and in the appended claims.

Figure 2:
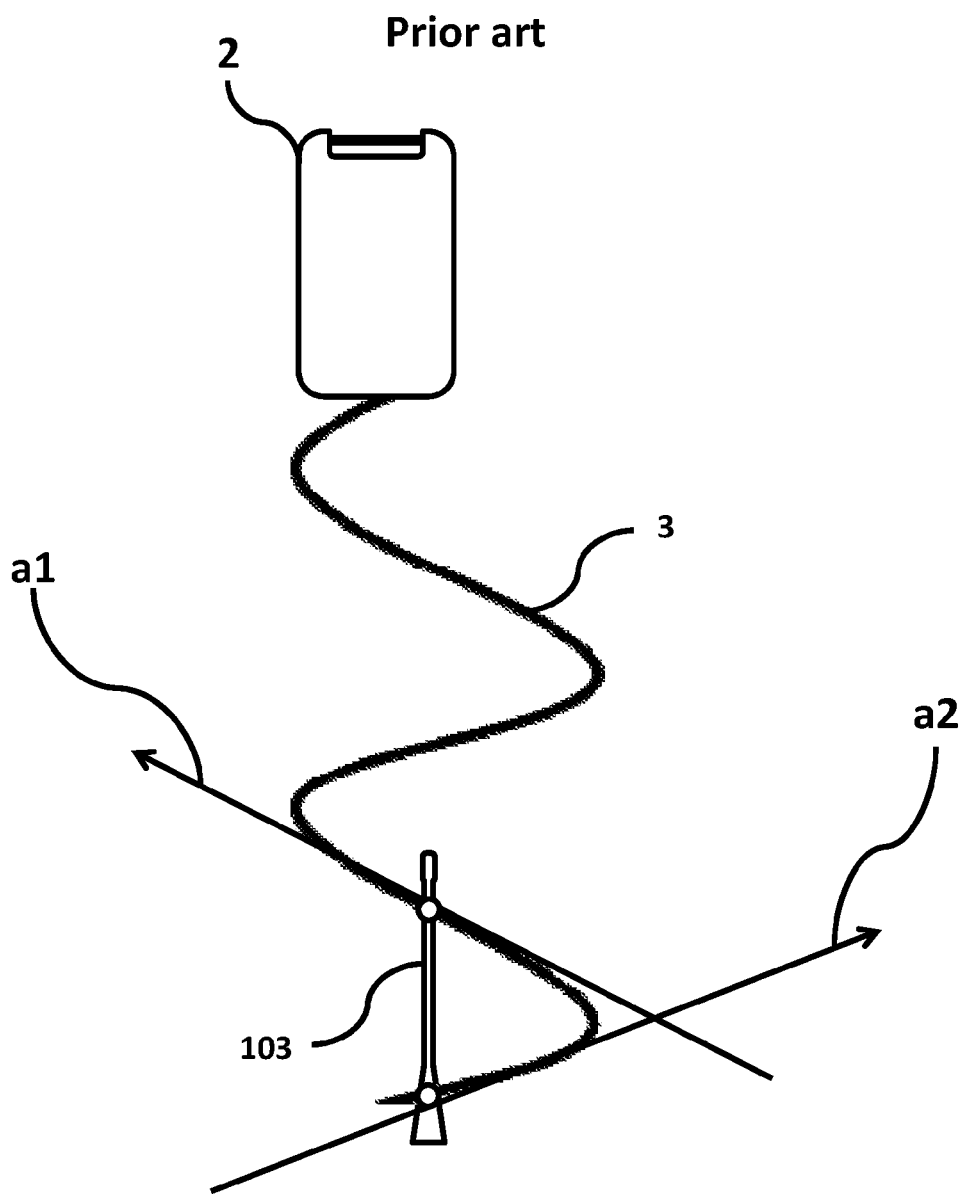
FIG. 2 illustrates a single antenna prior art solution wherein angle of arrival is utilized.

FIG. 2 illustrates a prior art solution where a single antenna element is utilized to get an angle of arrival. One of many problems with prior art solutions for poisoning, and especially for indoor positioning, is that the accuracy is low even for short distances. Angle of arrival estimations is no exception. As illustrated in FIG. 2 the RM is received by the antenna element 103 and the angle of arrival is recorded. Dependent on when in time the arrival angle is recorded it differs due to echoes and the frequency oscillation of the signal. This has the effect that vectors a1, a2 will have completely different directions. Although an average can provide some guidance towards the direction of the device 2 the uncertainty error is considerably large.

Figure 3:
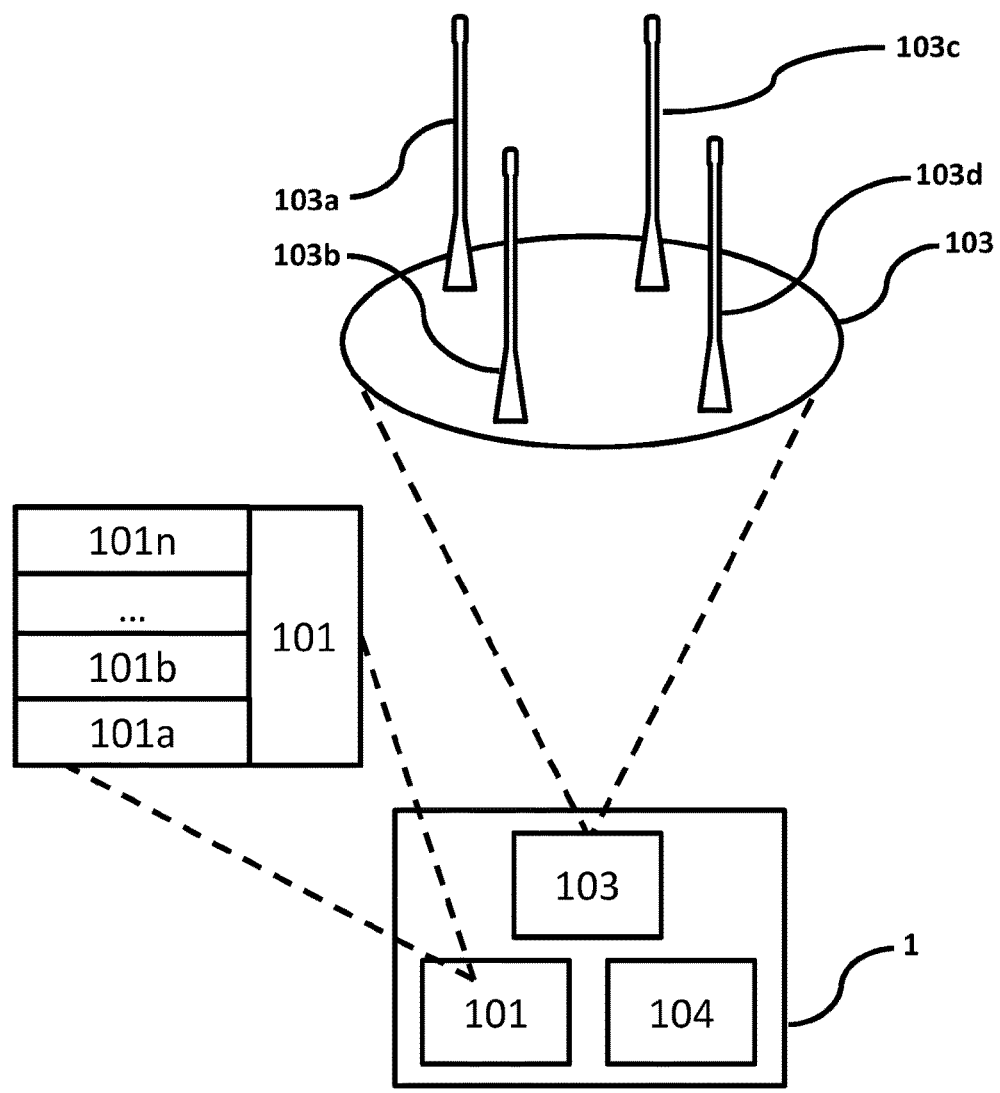
FIG. 3 illustrates one embodiment of a principle drawing of a node 1 comprising abstraction layers, a counter, and multiple antenna elements.

FIG. 3 illustrates one embodiment of a node 1 comprising abstraction layers 101, an antenna array 103, and a counter 104. The counter 104 is used for measuring time and is also known as time counter or timer in the art. Thus in context of the present application the term counter shall be interpreted as also include tome counters and timers. The antenna array 103 comprises at least three, in this example four, antenna elements 103a, 103b, 103c, 103d. The antenna elements 103a, 103b, 103c, 103d are arranged in a geometric form, such as a square or a circle, whit an even distance between each antenna array. The abstraction layers 101 are different layers 101a, 101b, . . . , 101n that are used for different things in the application. The person skilled in the art relates for example to the OSI model.

Figure 4:
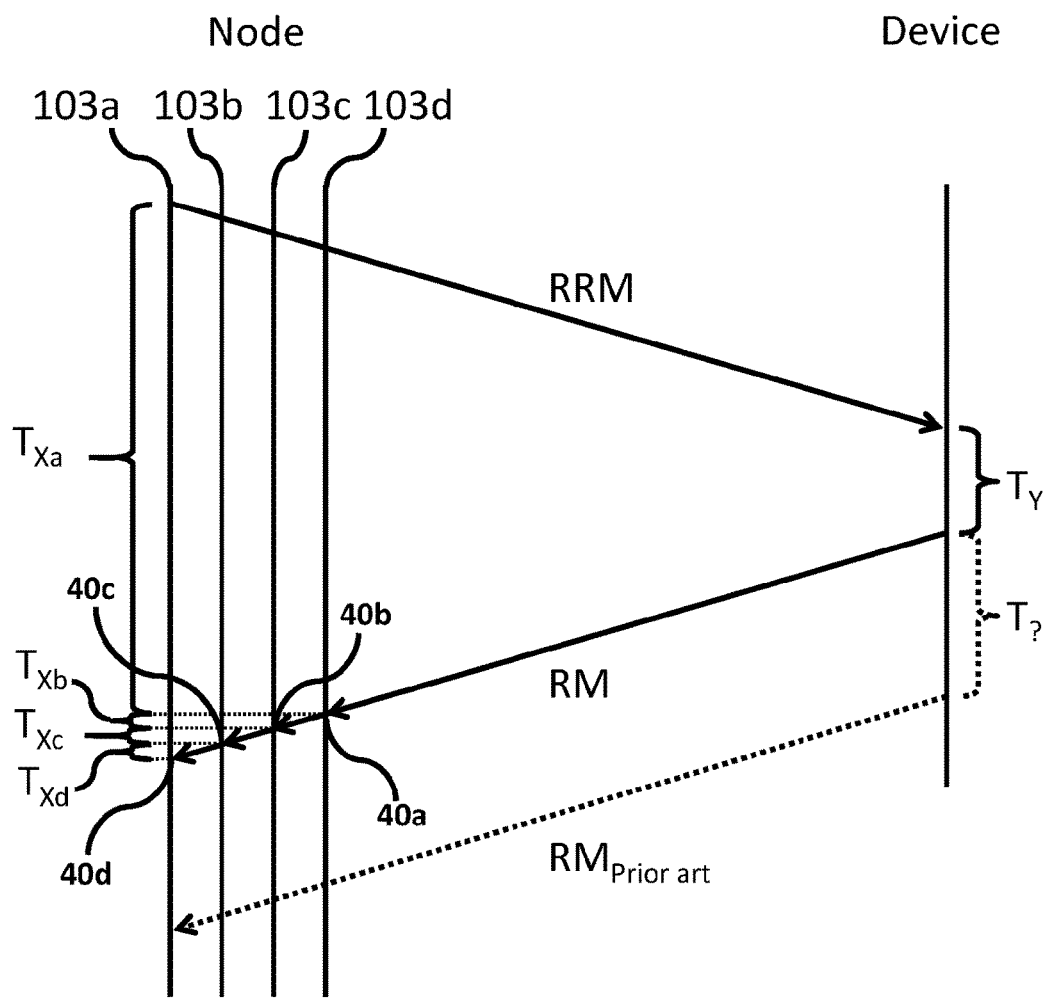
FIG. 4 illustrates a scheme of one embodiment illustrating transmission for response request message and the response thereto wherein the time axis is illustrated showing reception at each antenna element.

FIG. 4 shows an illustrative embodiment how the RRM and RM message are transmitted and received in the device 2 and node 1. The node 1 transmits the RRM to the device 2, for this either one or all of the antenna elements 103 can be used dependent of the embodiment. The Time of Flight, ToF, in a system according to the prior art is a single time measurement wherein the time is measured from when a signal is transmitted from the node until it is received back at the node via the device. However, in the solution as described herein a single signal is utilized for multiple measurements at the reception points 40a, 40b, 40c, 40d each corresponding to one antenna element 103a, 103b, 103c, 103d. Thereby it is one advantage with the present solution that a single signal is used to determine both Time of Flight and Angle of Arrival.

According to an embodiment the node calculates the Time of Flight, ToF based on the counter results and an internal response time of the device as $$ToF = (T_{Xa} + T_{Xb} + \ldots + T_{Xn}) - T_Y.$$

wherein $T_{Xn}$ describes the time of flight at each antenna and $T_Y$ is the processing time in the device. Since the counter is implemented in either the physical or the data link layer the processing time $T_Y$ may be determined very accurately since the conditions in these layers are predictable and not reliant on other functions as is the case for higher layers where the workload may slow down the processing time.

FIG. 4 further illustrates a method of determining the distance between a node 1 and a device 2. The node 1 may transmit a RRM and start a counter adapted to measure the Time of Flight for the RRM and the RM. The device 2 transmits a RM and as the RM is received at the node 1 the counter is stopped. The Time of Flight is thereafter determined with means of the result from the counter. As shown in FIG. 4 the counter register multiple times, one for each antenna element 103. Multiple measurements provide better resolution for the ToF measurement.

Figure 5:
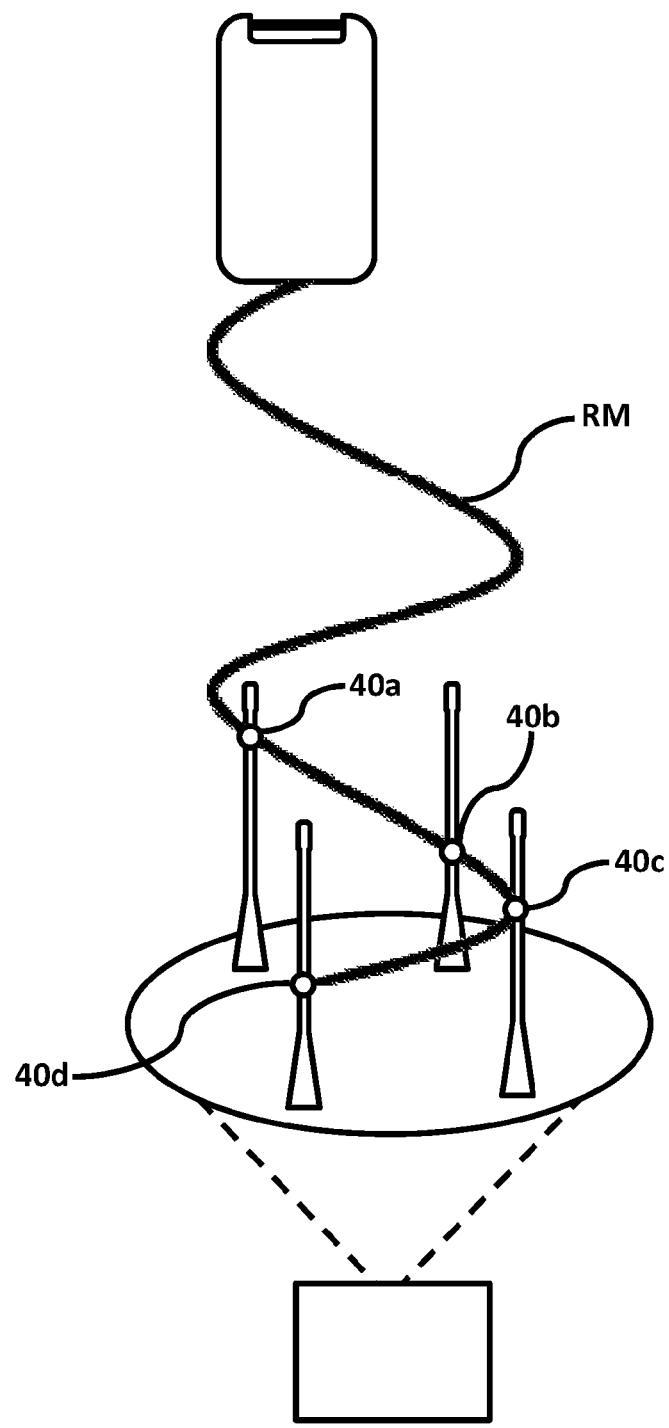
FIG. 5 illustrates one embodiment of a transmission of a response message and the reception of it at the multiple antenna elements of the node.

FIG. 5 illustrates a device 2 sending a RM to the node 1. The RM is a radio wave with oscillating characteristics and travels through the air towards the node 1. At reception at the node 1 the RM is received at multiple reception points 40a, 40b, 40c, 40d, each corresponding to an antenna element. This has the effect that the RM is received at four different points, each having a unique received phase. The simultaneous reception of the signal provides at least three independent receptions that can be compared with each other. Thus, in one embodiment the real Angle of Arrival 41 may be calculated by using the phase difference of at least two antennas, the distance between the antennas and the wavelength of the carrier wave.

There is advantages in relation to prior art, for example in relation to battery life. In general, more nodes mean more transmissions and thereby reduced battery life.

The device 2 is, as long as it doesn't act as a node, adapted only to receive and transmit a RM. This has the effect that battery life can be improved in the device 2, since the calculations being conducted in a node instead. In one embodiment signal strength is used to enhance ToF.

Another advantage of the phase-based AoA measurement as shown in FIG. 4 with omni-directional antennas compared to directional antennas is that a much better angular accuracy can be achieved. If we use an example of 4 antennas, we can achieve an angular resolution somewhere close to +/−5 degrees when using phase difference to calculate the AoA, compared to perhaps +/−30 degrees (or worse) for a "directional" antenna that needs to cover a 90-degree field-of-view (i.e. where 4 antennas cover 360 degrees). Therefore, we can potentially much more accurately locate a device using the calculated AoA.

There are additional benefits with the technology in relation to improving the reliability and range of the ToF measurement. The technique combining ToF and phase-based AoA has a unique advantage over other systems since the ToF measurements gets much more accurate at the same time as the Angle of Arrival can be calculated. Thereby creating a single node positioning system.

Additionally the range for ToF is increased. If you have multiple antennas they will equalize and reduce the variations in signal strength and thereby reduce disturbance to the signal. Multiple antennas furthermore minimize the signal cancelation influence.

AoA works at a greater distance than time of flight. This is not dependent of if the signal is strong or weak but the ToF is very dependent of a strong signal. This provides the advantage that if the node is a mobile node, such as a smartphone, the user holding the node and searching for the device can travel in the correct direction until in range for ToF and then determine the position of the device.

It is furthermore advantageous for the battery life that a single RM is used for both AoA and ToF.

Figure 6A:
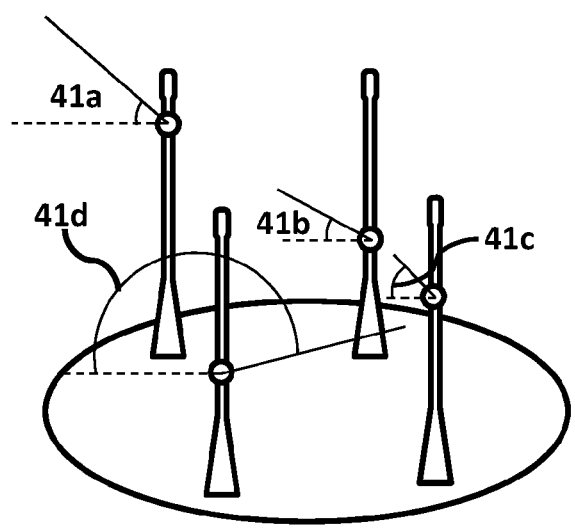
FIG. 6a illustrates one embodiment of an array of antenna elements, their reception points, and angles of arrival.
Figure 6B:
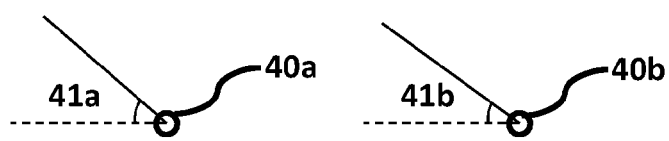
FIG. 6b illustrates an illustrative example of reception points and angles of arrivals.
Figure 6B:
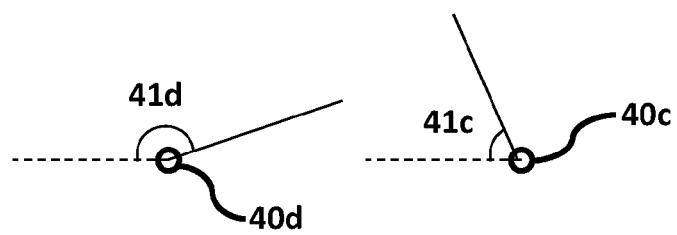

FIGS. 6a and 6b illustrates an array of antennas with reception points 40a, 40b, 40c, 40d. At each reception point a phase angle 41a, 41b, 41c, 41d is received and thereby a correct AoA of the signal can be calculated.

Figure 7:
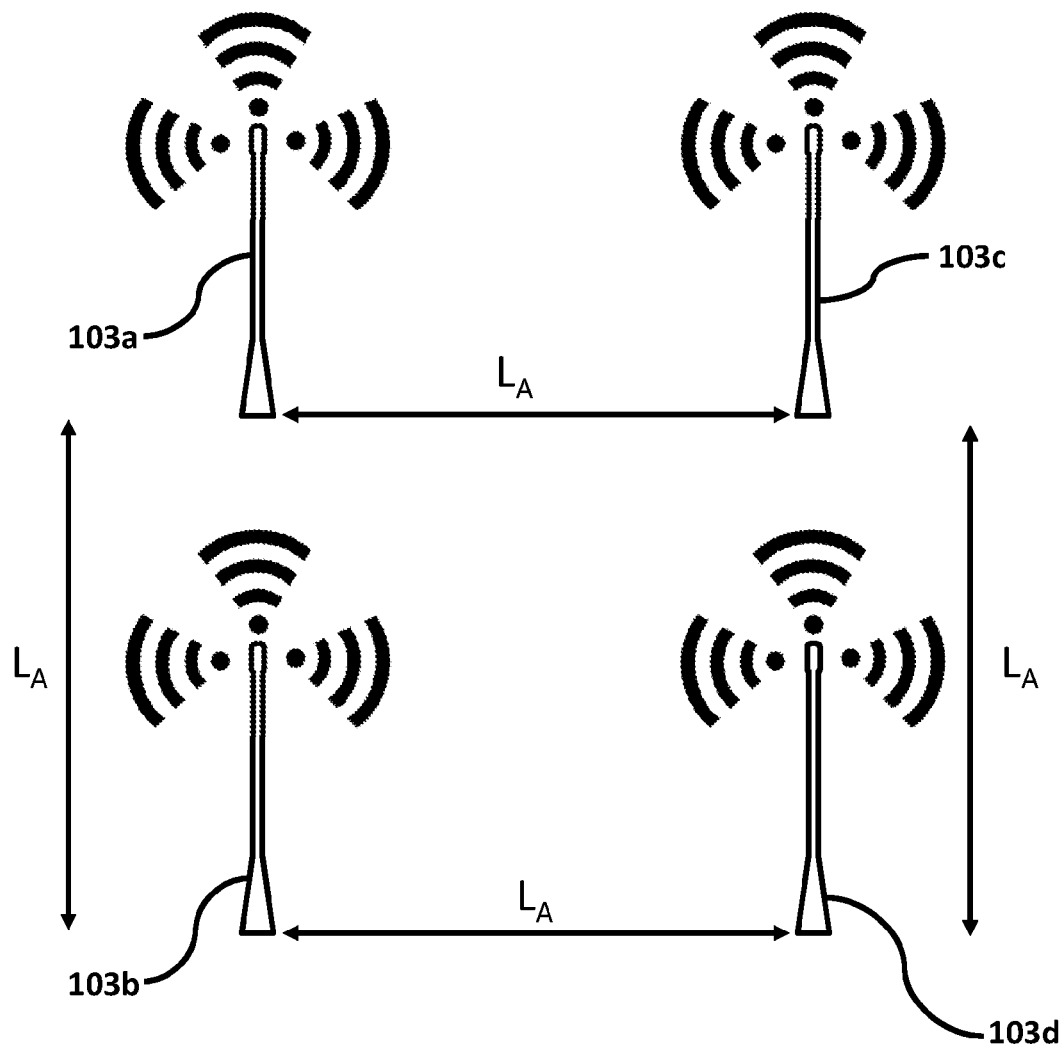
FIG. 7 illustrates one embodiment of an antenna array comprising multiple Omni-directional antenna elements and the constant distance between the positions of each antenna element.

FIG. 7 illustrates the distances within the antenna arrays.

Figure 8:
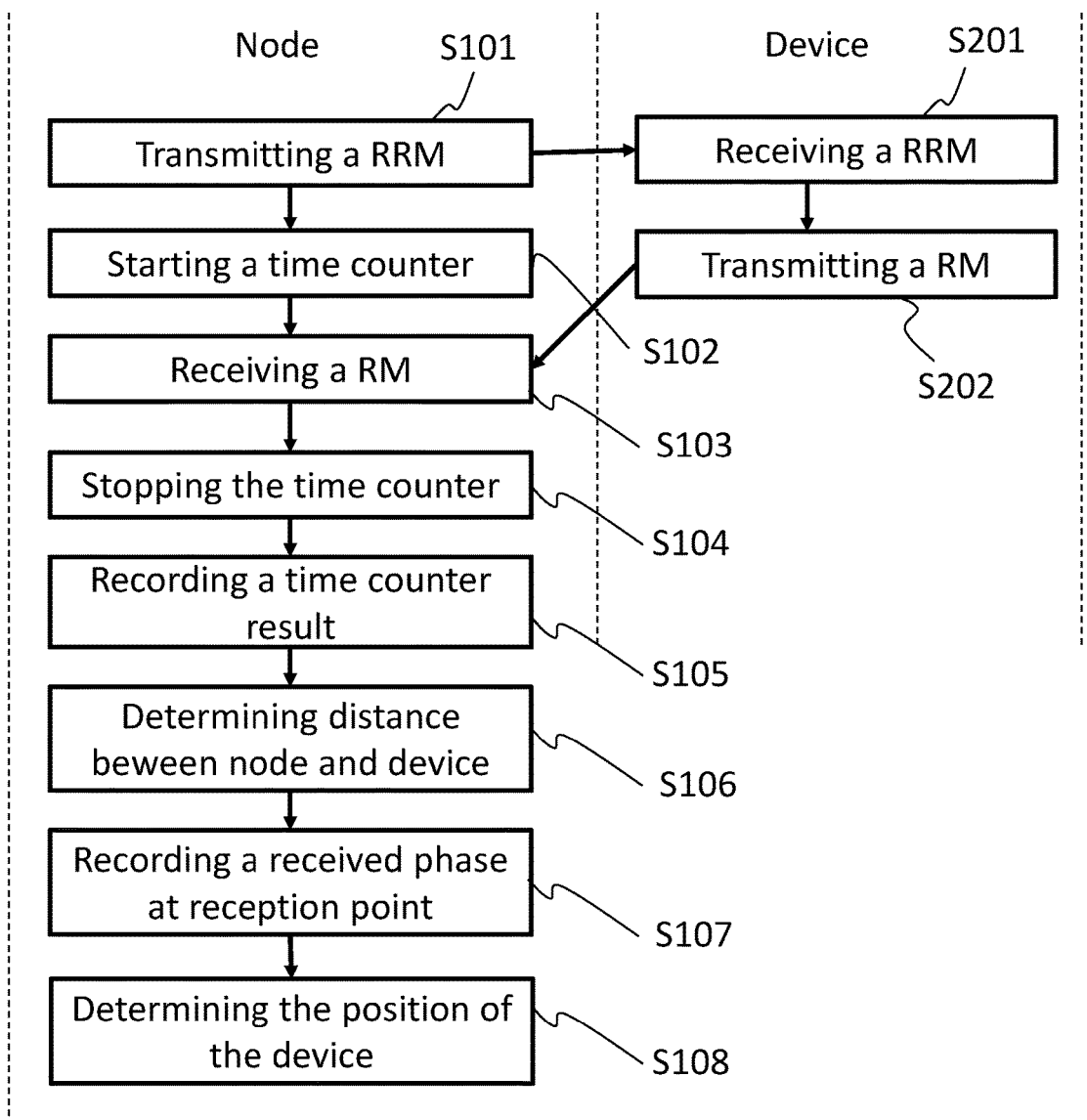
FIG. 8 illustrates a schematic view showing one embodiment.

FIG. 8 illustrates a schematic view of the method.

The invention claimed is:

1. Method performed by a node for determining the position of a device, the method comprising:
   transmitting (S101) a Response Request Message, RRM, to the device;
   starting (S102) at least one time counter at the transmission of the RRM from a physical or data link layer of multiple abstraction layers being adapted to perform different tasks in the node,
   receiving (S103) a Response Message, RM, from the device as a response to the RRM,
   stopping (S104) the at least one time counter at the reception of the RM, wherein the method further comprises:
   recording (S105) a time counter result (TXa, TXb, . . . , TXn) at the reception of the RM in the physical or data link layer for each of at least three omni-directional antenna elements in the node using the at least one time counter,
   determining (S106) the distance between the node and the device based on the recorded time counter results (TXa, TXb, . . . , TXn),
   recording (S107) a received phase at a reception point of each of the at least three omni-directional antenna elements for the reception of the RM,
   calculating an Angle of Arrival, AoA, based on the differences of the received phases and a transmission frequency for the RRM and/or the RM, and
   determining (S108) the position of the device based on the determined distance and the calculated AoA,
   wherein the RRM and the RM are signals at a frequency between 860 and 930 MHz, or between 430 and 480MHz, or between 2.4 and 2.5GHz, or between 5.0 and 6.0GHz.

2. The method according to claim 1, wherein the distance is determined in the node by calculating a Time of Flight, ToF based on the time counter results (TXa, TXb, . . . , TXn) and an internal response time (TY) of the device as ToF=(TXa+TXb+ . . . +TXn)−TY.

3. The method according to claim 2, further comprising:
   determining an absolute position of the node by means of a second positioning means arranged in said node,
   determining an absolute position of the device based the determined absolute position of the node, the AoA, and the ToF.

4. The method according to claim 2, wherein the method is performed more than once and the method further comprises:

collecting multiple ToFs and calculated AoAs,
determining an average error based on the collected ToFs and calculated AoAs, and
using the average error when determining the position of the device.

5. The method according to claim 1, wherein the at least three omni-directional antenna elements are arranged at distances equally spaced from each other and the distance corresponds to less than half the wavelength of the transmission frequency for the RRM and/or the RM.

6. The method according to claim 5, wherein the distance (LA) is between 10.8 and 11.1 cm.

7. The method according to claim 1, wherein the AoA and ToF are based on a single RM.

8. A computer program, comprising computer readable code means, which when executed in
a node for determining the position of a device, wherein the node is configured to transmit a Response Request Message, RRM, to the device, start at least one time counter at the transmission of the RRM from a physical or data link layer of multiple abstraction layers being adapted to perform different tasks in the node, receive a Response Message, RM, from the device as a response to the RRM, stop the at least one time counter at the reception of the RM, wherein the node further is configured to record a time counter result (TXa, TXb, . . . , TXn) at the reception of the RM in the physical or data link layer for each of at least three omni-directional antenna elements in the node using the at least one time counter, determine the distance between the node and the device based on the recorded time counter results (TXa, TXb, . . . , TXn), record a received phase at a reception point of each of the at least three omni-directional antenna elements for the reception of the RM, calculate an Angle of Arrival, AoA, based on the differences of the received phases and a transmission frequency for the RRM and/or the RM, and determine the position of the device based on the determined distance and the calculated AoA,
causes the node to perform the method according to claim 1.

9. A node for determining the position of a device, wherein the node is configured to transmit a Response Request Message, RRM, to the device, start at least one time counter at the transmission of the RRM from a physical or data link layer of multiple abstraction layers being adapted to perform different tasks in the node, receive a Response Message, RM, from the device as a response to the RRM, stop the at least one time counter at the reception of the RM, wherein the node further is configured to record a time counter result (TXa, TXb, . . . , TXn) at the reception of the RM in the physical or data link layer for each of at least three omni-directional antenna elements in the node using the at least one time counter, determine the distance between the node and the device based on the recorded time counter results (TXa, TXb, . . . , TXn), record a received phase at a reception point of each of the at least three omni-directional antenna elements for the reception of the RM, calculate an Angle of Arrival, AoA, based on the differences of the received phases and a transmission frequency for the RRM and/or the RM, and determine the position of the device based on the determined distance and the calculated AoA, wherein the RRM and the RM are signals at a frequency between 860 and 930 MHz, or between 430 and 480 MHz, or between 2.4 and 2.5 GHz, or between 5.0 and 6.0 GHz.

10. A method performed by a device for enabling determination of the position of the device by a node, the node being a node according to claim 9, wherein said device performs a method comprising:
receiving (S201) a response request message, RRM from the node,
transmitting (S202) a Response Message, RM, to the node as a response to said RRM, wherein said RM is transmitted by a physical or data link layer of multiple abstraction layers in the device.

11. A method performed by a device for enabling determination of the position of the device by a node, the node being a node according to claim 9, wherein the device comprises multiple Omni-directional antenna elements and performs the method of a node according to claim 1.

* * * * *